United States Patent [19]
Buermann

[11] Patent Number: 5,752,372
[45] Date of Patent: May 19, 1998

[54] SELF-PROPELLING AGRICULTURAL MACHINE WITH TWO-PART CUTTING MECHANISM TROUGH

[75] Inventor: Dominik Buermann, Verl, Germany

[73] Assignee: Claas KGaA, Harsewinkel, Germany

[21] Appl. No.: 610,640

[22] Filed: Mar. 4, 1996

[30] Foreign Application Priority Data

Mar. 11, 1995 [DE] Germany ............... 195 08 887.5

[51] Int. Cl.⁶ .................................................. A01D 57/02
[52] U.S. Cl. .................. 56/10.2 E; 56/90; 56/130; 56/364; 56/DIG. 16
[58] Field of Search ........................ 56/364, 10.2 E, 56/16.4 R, 90, 130, 229, DIG. 15, DIG. 16, 10.2 D, 10.2 F

[56] References Cited

U.S. PATENT DOCUMENTS

| | | | |
|---|---|---|---|
| 3,643,407 | 2/1972 | Hubbard et al. | 56/10.2 E |
| 4,541,229 | 9/1985 | Eliyah | 56/10.2 E |
| 4,641,490 | 2/1987 | Wynn et al. | 56/10.2 E |
| 4,733,523 | 3/1988 | Dedeyne et al. | 56/10.2 E X |

*Primary Examiner*—Terry Lee Melius
*Attorney, Agent, or Firm*—Michael J. Striker

[57] ABSTRACT

In a self-propelling agricultural machine with a two-part cutting mechanism trough, the position of a cutter bar relative to a stationary part of the cutting mechanism trough is continuously determined, and a predetermined position of the reel is associated with each position of the cutter bar to prevent collision between the cutter bar and the reel.

5 Claims, 3 Drawing Sheets

SELF-PROPELLING AGRICULTURAL MACHINE WITH TWO-PART CUTTING MECHANISM TROUGH

BACKGROUND OF THE INVENTION

The present invention relates to a self-propelling agricultural machine with a two-part cutting mechanism trough.

More particularly, it relates to such a self propelling harvester thresher in which one part of the two-part cutting mechanism trough is connected fixedly with the harvester thresher and another part carries a cutter bar and is connected with a stationary part with an adjustable distance, and a position-adjustable drawing-in reel is associated with the cutting mechanism trough so that its adjustment is performed by an electromagnetically actuated cylinder-piston unit, and an average distance between the drawing-in reel and the cutter bar is fixed.

Harvester threshers with a one-piece cutting mechanism trough are known in the art. In these harvester threshers the cut stalk product is drawn-in by a reel. The reel is adjustable so that, for example in a laying position it can operate in underground operation. This means that the reel prongs operate in front of the cutter bar approximately with a ground contact.

At the present time more and more harvester threshers are proposed in which the cutter mechanisms themselves are composed of two parts, so that the distance from the reel to the cutter bar can be changed. Such an adjustment is advantageous to provide an optimum drawing-in of the stalk product with a minimum grain loss. In such self-propelling harvester threshers it is necessary to prevent colliding of the reel or its prongs with the more or less far extending cutter bar. For this purpose it is necessary to connect the reel device with the cutting mechanism trough by a lever arrangement so that, independently from the relative position of the cutter bar, a collision with the reel is avoided. Such a safety feature has however several disadvantages. First of all, this arrangement must be made so that it transmits high forces, and therefore the head load of a harvester thresher is increased. On the other hand, such an arrangement involves a plurality of hinge points, which must be thoroughly maintained to prevent their premature wear. A further substantial disadvantage of this construction is that the cost for such a safety device is relatively high.

SUMMARY OF THE INVENTION

Accordingly, it is an object of the present invention to provide a harvester thresher of the above mentioned general type, which avoids the disadvantages of the prior art.

More particularly, it is an object of the present invention to provide a harvester thresher of the above mentioned type, in which the above mentioned problems are solved with minimum use of mechanical parts to prevent colliding of the reel with the cutter bar during any possible relative adjustment of the cutter bar.

In keeping with these objects and with others which will become apparent hereinafter, one feature of the present invention resides, briefly stated, in a harvester thresher in which the relative position of the movable cutting mechanism trough part with respect to the stationary cutting mechanism trough part is continuously monitored, and for maintaining an average height position of the reel required for maintaining an average distance between the reel and the cutter bar is controlled in correspondence with the respective relative position by influencing of the electromagnetic valve.

When the harvester thresher is designed in accordance with the present invention, in a simple manner a control cam can be connected with the side wall of the moveable cutting mechanism trough part, and a sensor mounted on the reel can cooperate with the control cam so that the sensor acts on the electromagnetic valve of the cylinder-piston unit for lifting and lowering of the reel.

In the harvester thresher described hereinabove and provided with such a device, the harvester thresher cannot assume during manual actuation of the electromagnetic valve in the driver's cabin any position in which the reel collides with the cutter bar.

In harvester threshers which operate with a computer, the inventive objectives can be achieved with sensors which determine a relative position of the extendable cutting mechanism trough half relative to the stationary cutting mechanism trough half, a horizontal distance of the reel relative to the stationary cutting mechanism trough part, and an angular position of the supporting arm which carries the reel. The determined values are supplied in a computer associated with a self-propelling harvester thresher, and the computer which utilizes a predetermined program influences the electromagnetic valve for the adjustment of the corresponding cylinder-piston unit so that the predetermined positions of the reel and the cutter bar cannot be started. In such a case, the harvester thresher as before can activate manually the electromagnetic valves which are associated with the hydraulic cylinder-piston units for extending the cutter bar, for lifting the supporting arm of the reel and for horizontal movement of the reel on the supporting arm, with the limitation that certain preselectable positions of the reel relative to the cutter bar are blocked.

In accordance with another advantageous feature of the present invention, when it is necessary to harvest great field areas a predetermined position of the reel is associated with each relative position of the extensible cutting mechanism trough part relative to the stationary cutting mechanism trough part. In this way, the operation of the harvester thresher is substantially facilitated since the extension movement of the cutter is manually controlled while the reel fully automatically is adjusted in correspondence with the position of the cutter bar by a program provided in the computer. It is to be understood that it is possible to provide in the computer different programs so that the harvester thresher driver can select a program corresponding to the specific harvesting conditions.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
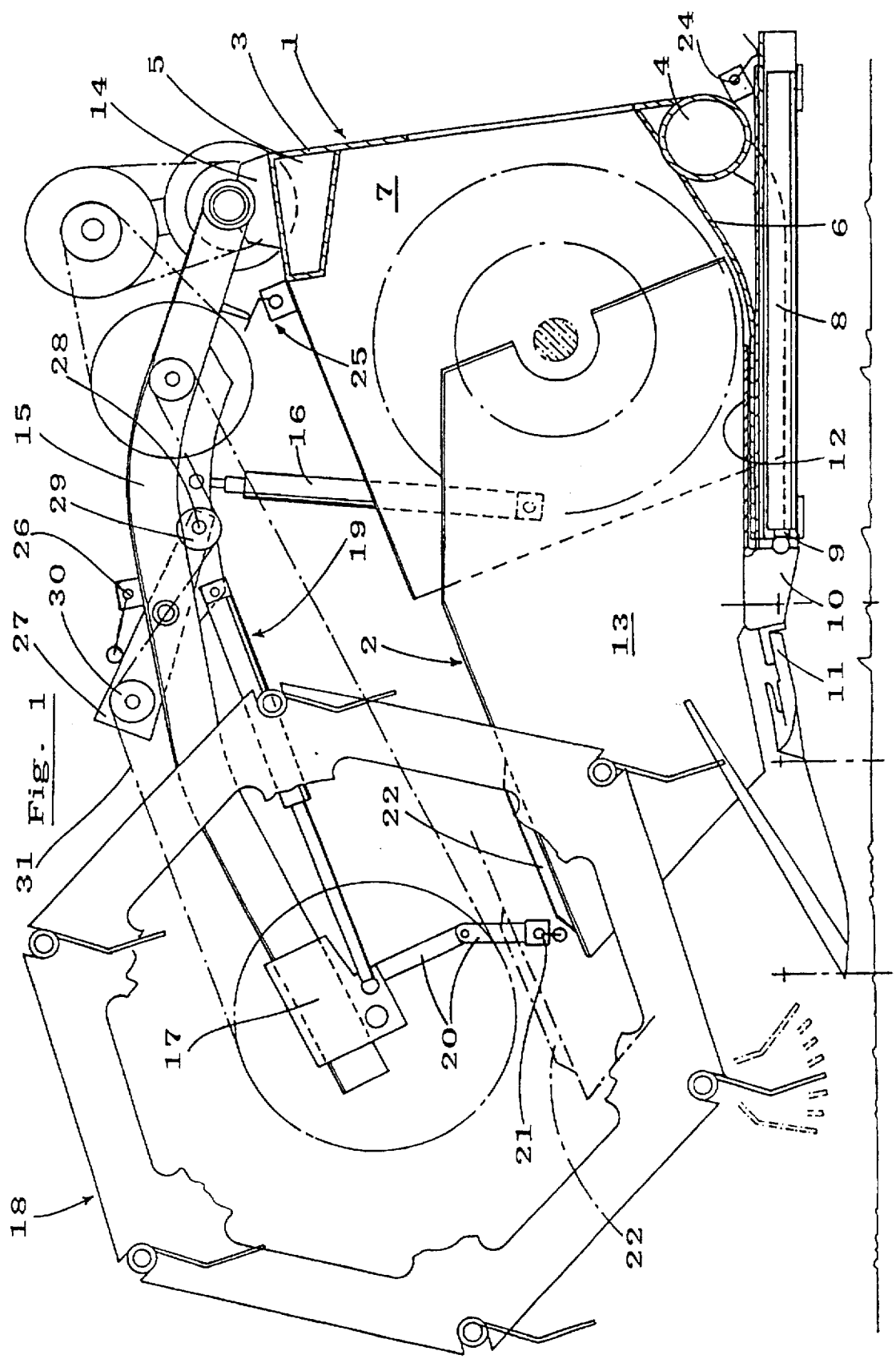
FIG. 1 is a side view showing a front part of a self-propelling harvester thresher in accordance with the present invention.

A harvester thresher has a cutting mechanism with a cutting mechanism trough including a stationary part 1 and a movable part 2. The stationary part 1 includes a rear base frame 3, a supporting pipe 4, and a reinforcing profile 5. A bottom plate 6 is fixedly connected with the base frame 3 through the supporting pipe 4. Side walls 7 are connected both with the bottom as well as with the base frame 3.

Several cylinder-piston units 8 which are arranged at a distance from one another and located under the bottom plate 6. Their piston rods 9 engage a transverse support 10 which carries a cutter bar 11. A further bottom plate 12 is connected with the transverse support 10 which overlaps the bottom plate 6 in the position shown in FIG. 1. Side walls 13 are connected with the bottom plate 12 and the support 10. The bottom plate 12 and the side walls 13 form the cutting mechanism trough part 2 which is displaceable with the support 10 and the cutter bar 11. The positions of the moveable cutting mechanism trough part 2 relative to the stationary cutting mechanism trough 1 are changeable by actuation of the cylinder-piston units 8.

Consoles 14 are screwed to the reinforcing profile 5 of the stationary cutting mechanism trough part 1, and supporting arms 15 which are parallel relative to one another are supported in the consoles. The supporting arms 15 are liftable and lowerable by the cylinder-piston units 16. Carriages 17 are arranged on the supporting arms 15, and a reel 18 is driveably supported on the carriages. The carriages 17 can be reciprocatingly displaced on the supporting arms 15 by actuation of the cylinder-piston units 19. As can be seen from FIG. 1, an angular lever can be fixedly connected with at least one carriage 17. It carries a microswitch 21 at its end which faces away from the carriage 17. A control track 22 is associated with the microswitch 21 and mounted on one side wall 13 of the moveable cutting mechanism trough part 2.

When the cylinder-piston units 8 are actuated, the cutter bar 11 runs from its position shown in FIG. 1 to the left. The microswitch 21 or the roller associated with it runs on the cam 22 and actuates thereby the microswitch 21. With such an actuation the cylinder-piston units 16 are actuated for lifting for such a time until the microswitch 21 is no longer in contact with the control cam 22. From this position the reel 18 can be lifted further from the harvester thresher by further actuation of the cylinder-piston units 15. The lowering movement of the reel 18 is interrupted however automatically when the harvester thresher driver holds the electromagnet for the cylinder-piston units 16 permanently in direction "lowering" as long as the microswitch 21 is in contact with the control cam 22.

Figure 2:
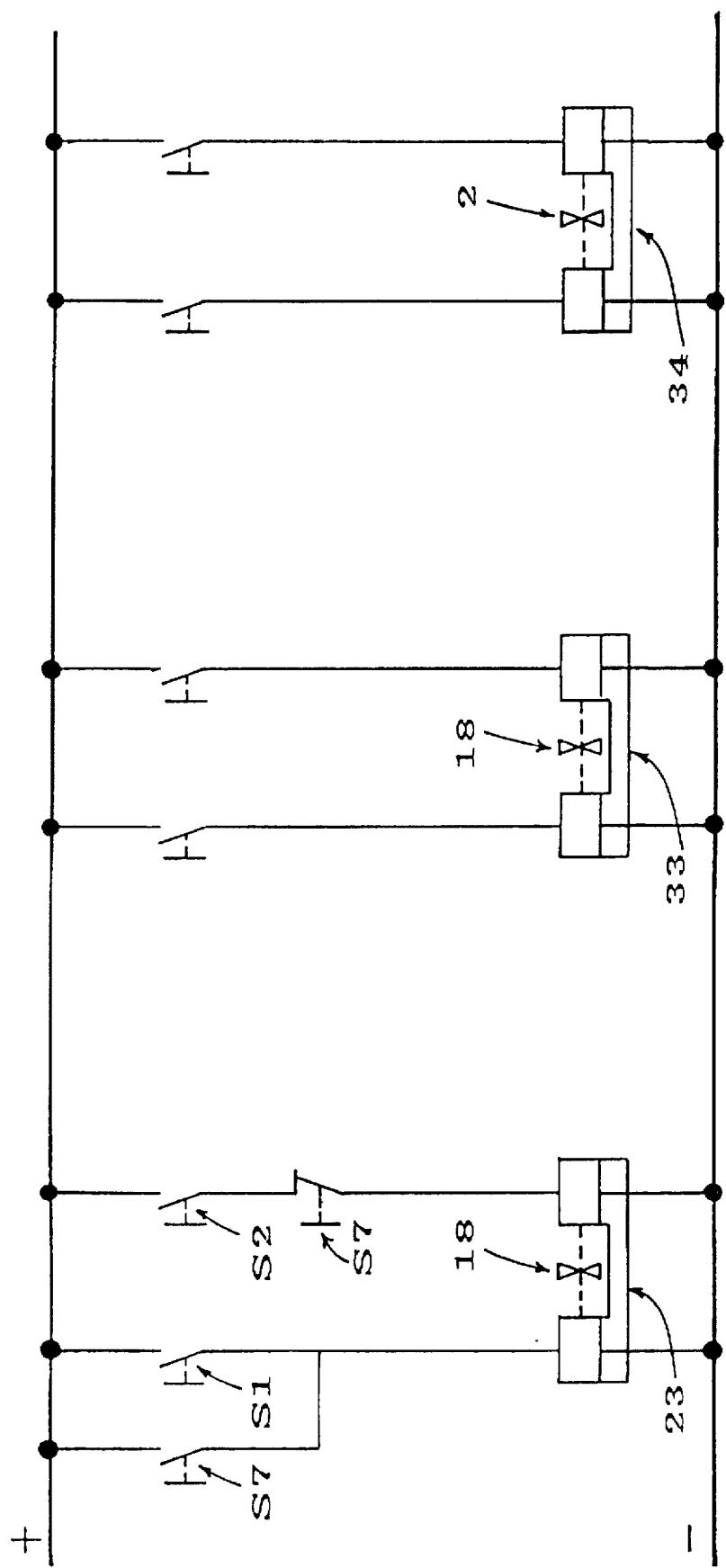
FIG. 2 is a view showing a current diagram of the harvester thresher in accordance with the present invention.

This operation is illustrated in the current diagram in FIG. 2. It can be seen from the current diagram that an electromagnetic valve 23 is associated with the schematically shown reel 18, with possible positions of lifting "S1" and lowering "S2".

Both switching possibilities can be controlled by the driver of the harvester thresher. When however the microswitch 21 runs on the curved track 22 as shown in FIG. 1, the switch S7 is actuated, so that the valve 23 is actuated in direction for lifting for such a time until the microswitch 21 is no longer in contact with the control cam 22. This lifting movement is independent from the fact whether the driver of the harvester thresher actuates the switch S1 or does not actuate the same. For the case when the reel 18 must be lowered from a lifted position, a driver of the harvester thresher actuates the switch S2 shown in FIG. 2. In the moment, in which during this lowering process the microswitch 21 of FIG. 1 contacts the control cam 22, the switch S7 of the electromagnetic valve 23 is actuated, so that with the switch S2 held closed by the driver, the lowering process is interrupted. Thereby a collision between the reel and the cutter bar is prevented in the above described simple manner.

When a harvester thresher cooperates with a computer 32, a displacement pick up 24 is associated with at least one cylinder-piston unit 8. It determines the value of extension of the cutter bar 11 from its completely drawn-in position and supplies this value to the computer. Furthermore, a rotary angle transducer 25 is associated with at least one supporting arm 15 of the reel 18. Starting from a reference point, it determines the corresponding angular position of the supporting arm 15 relative to the reference point and supplies this value also to the computer. A further angle transducer 26 is mounted on at least one supporting arm 15 and influenced by the corresponding angular position of a lever 27. The lever 27 is supported on the supporting arm 15 turnably about a turning axis 28. Deviating rollers 29 and 30 are provided at both ends of the lever 27 for guiding a drive chain 31 for the reel 18.

Figure 3:
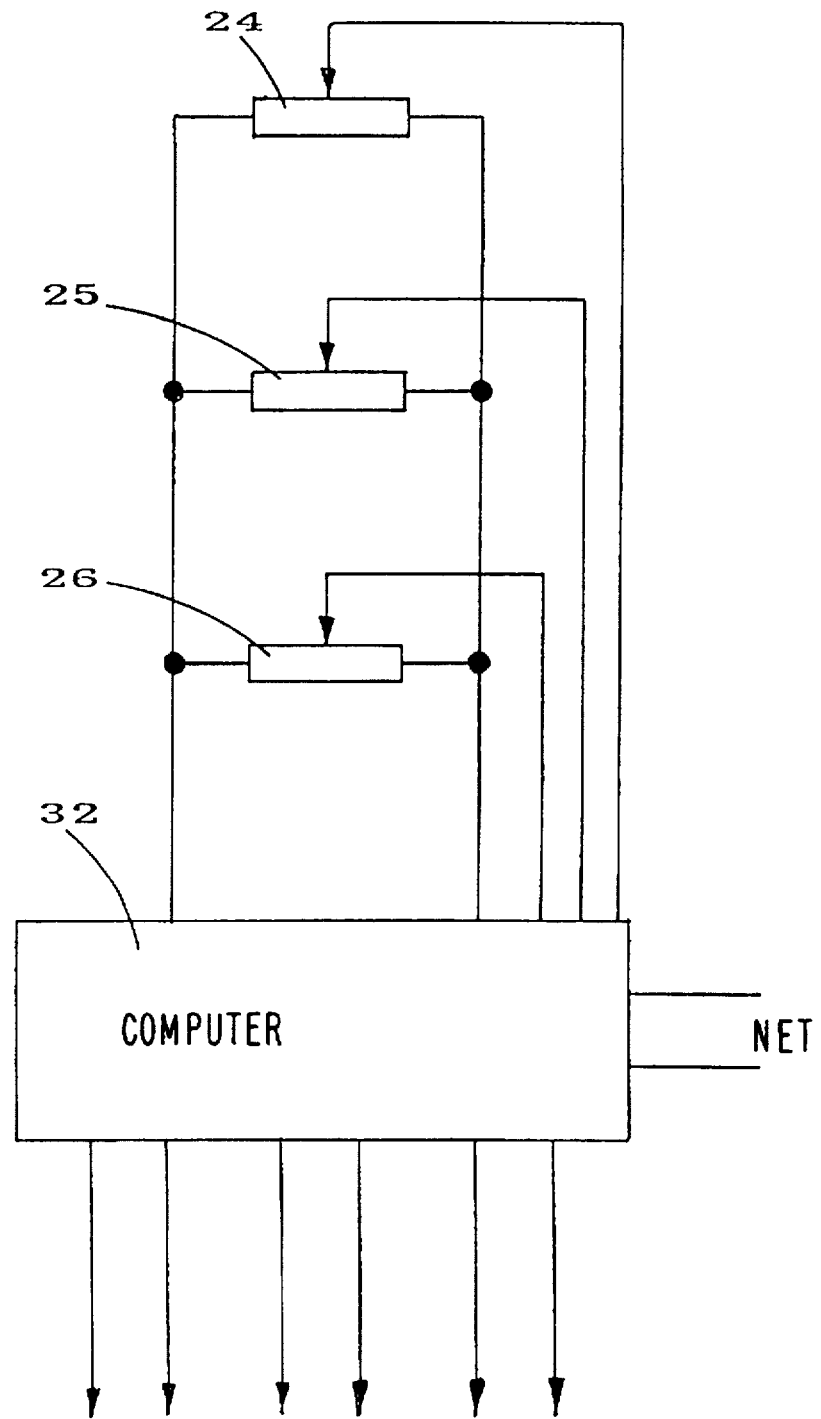
FIG. 3 is a view showing a block diagram of the inventive harvester thresher.

Depending on the position of the carriage 17 of the reel 18 on the supporting arm 15, the lever 27 is turned and thereby influences the rotary angle transducer 26. The position of the levers 27 determined by the rotary angle transducer 26 is also supplied to the computer. The computer 32 which is schematically identified in FIG. 3 is formed so that it can compared the values from the displacement pick up 24 and the rotary angle transducers 25 and 26 with one another and in the case of the values which correspond to the previously determined combinations actuates the electromagnetic valves 23, 33 and 34 so that corresponding predetermined positions of the reel 18 relative to the cutter bar 11 cannot be started.

It will be understood that each of the elements described above, or two or more together, may also find a useful application in other types of constructions differing from the types described above.

While the invention has been illustrated and described as embodied in a self-propelling agricultural machine with two-part cutting mechanism trough, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A self-propelling agricultural machine, comprising a cutter bar; a cutting mechanism trough including a first stationary part and a second part which carries said cutter bar and is displaceable relative to said first stationary part to adjust a distance between said parts; a drawing-in reel associated with said cutting mechanism trough and arranged displaceably relative to said cutting mechanism trough so that an average distance from said drawing-in reel to said cutter bar can be fixed; an electromagnetically actuated cylinder-piston unit operative for displacing said drawing-in reel; means for determining a relative position of said second part relative to said first part of said cutting mechanism trough, said cylinder-piston unit having electromagnetic valves actuated in dependence on a relative position of said second part relative to said first part determined by said determining means so that an average height of said reel corresponding to the relative position of said second part relative to said first part determined by said determining means is provided for maintaining said average distance of said reel relative to said cutter bar.

2. A self-propelling agricultural machine as defined in claim 1, wherein said second part of said cutting mechanism trough has a side wall connected with a control cam, said determining means including a sensor which is mounted on said reel and cooperates with said control cam, said sensor acting on one of said electromagnetic valves of said cylinder-piston units for lifting and lowering of said reel.

3. A self-propelling agricultural machine as defined in claim 1, wherein said determining means include sensors which correspondingly determine a relative position of said second part relative to said first part of said cutting mechanism trough, a horizontal distance of said reel from said first part of said cutting mechanism trough, and an angular position of a supporting arm which carries said reel; and further comprising a computer which receives values determined by said sensors and acts on said electromagnetic valves to displace said cylinder-piston units so that predetermined positions of said reel and said cutter bar can not be started.

4. A self-propelling agricultural machine as defined in claim 1, wherein said parts of said cutting mechanism trough and said reel are arranged so that a predetermined position of said reel is associated with each relative position of said second part relative to said first part of said cutting mechanism trough.

5. A self-propelling agricultural machine as defined in claim 1, wherein said parts of said cutting mechanism trough and said reel are arranged so that a predetermined relative position of said second part relative to said first part of said cutting mechanism trough is associated with each position of said reel.

\* \* \* \* \*